United States Patent
Wang et al.

(10) Patent No.: US 11,398,228 B2
(45) Date of Patent: Jul. 26, 2022

(54) VOICE RECOGNITION METHOD, DEVICE AND SERVER

(71) Applicant: Beijing Baidu Netcom Science and Technology Co., Ltd., Beijing (CN)

(72) Inventors: Zhijian Wang, Beijing (CN); Sheng Qian, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 202 days.

(21) Appl. No.: 16/164,759

(22) Filed: Oct. 18, 2018

(65) Prior Publication Data

US 2019/0237071 A1 Aug. 1, 2019

(30) Foreign Application Priority Data

Jan. 29, 2018 (CN) .......................... 201810085826.0

(51) Int. Cl.
*G10L 15/22* (2006.01)
*G10L 15/30* (2013.01)
*G10L 15/08* (2006.01)

(52) U.S. Cl.
CPC .............. *G10L 15/22* (2013.01); *G10L 15/08* (2013.01); *G10L 15/30* (2013.01); *G10L 2015/088* (2013.01)

(58) Field of Classification Search
CPC ... G10L 15/22; G10L 2015/223; G10L 15/30; G10L 2015/088; G10L 15/02
See application file for complete search history.

(56) References Cited

U.S. PATENT DOCUMENTS

| | | | | |
|---|---|---|---|---|
| 9,691,378 B1* | 6/2017 | Meyers | ................. | G10L 15/20 |
| 9,911,413 B1* | 3/2018 | Kumar | ................. | G10L 15/16 |
| 10,152,966 B1* | 12/2018 | O'Malley | ............... | G10L 15/22 |
| 10,593,328 B1* | 3/2020 | Wang | ...................... | G10L 15/22 |
| 10,706,845 B1* | 7/2020 | Devaraj | ................. | G06F 3/017 |
| 2016/0267913 A1 | 9/2016 | Kim et al. | | |

(Continued)

FOREIGN PATENT DOCUMENTS

| | | |
|---|---|---|
| CN | 1568500 A | 1/2005 |
| CN | 101044550 A | 9/2007 |

(Continued)

OTHER PUBLICATIONS

Japanese Office Action for Japanese Patent Application No. 2018-167826, dated Sep. 11, 2019, 13 pages.

(Continued)

*Primary Examiner* — Mark Villena
(74) *Attorney, Agent, or Firm* — Kinney & Lange, P.A.

(57) ABSTRACT

A voice recognition method, device, and a server are provided. The method includes: receiving a user voice; determining a wake-up voice of a wake-up word in the user voice, according to an acoustic feature of the user voice; and labeling the wake-up voice with a silence identifier; and ignoring the wake-up voice based on the silence identifier during voice recognition. As such, when a complex decoding algorithm is used to recognize the user voice, recognition of the wake-up word that is irrelevant to an instruction of the user is omitted, thus reducing the data amount to be processed by the decoding algorithm and improving the efficiency of voice recognition.

8 Claims, 2 Drawing Sheets

(56) References Cited

U.S. PATENT DOCUMENTS

| | | | |
|---|---|---|---|
| 2016/0358605 A1* | 12/2016 | Ganong, III | H04W 40/005 |
| 2017/0270919 A1 | 9/2017 | Parthasarathi et al. | |
| 2018/0018961 A1* | 1/2018 | Lee | G06F 3/04842 |
| 2018/0061409 A1* | 3/2018 | Valentine | G10L 15/24 |
| 2019/0005954 A1* | 1/2019 | Xie | G10L 15/063 |
| 2019/0043492 A1* | 2/2019 | Lang | G10L 15/22 |
| 2019/0043503 A1 | 2/2019 | Bauer et al. | |
| 2019/0206396 A1* | 7/2019 | Chen | G10L 15/30 |
| 2020/0051554 A1* | 2/2020 | Kim | G06F 3/167 |

FOREIGN PATENT DOCUMENTS

| | | | |
|---|---|---|---|
| CN | 101110929 A | 1/2008 |
| CN | 101385075 A | 3/2009 |
| CN | 102999161 A | 3/2013 |
| CN | 103943105 A | 7/2014 |
| CN | 104254056 A | 12/2014 |
| CN | 104754364 A | 7/2015 |
| CN | 105654943 A | 6/2016 |
| CN | 105913843 A | 8/2016 |
| CN | 105959772 A | 9/2016 |
| CN | 106598666 A | 4/2017 |
| CN | 106710606 A | 5/2017 |
| CN | 106782554 A | 5/2017 |
| CN | 106847273 A | 6/2017 |
| CN | 106898352 A | 6/2017 |
| CN | 107071575 A | 8/2017 |
| CN | 107123418 A | 9/2017 |
| CN | 107146605 A | 9/2017 |
| CN | 107452401 A | 12/2017 |
| CN | 107608799 A | 1/2018 |
| JP | H11212590 A | 8/1999 |
| JP | 2016024378 A | 2/2016 |

OTHER PUBLICATIONS

Chinese Search Report dated May 22, 2020, received for corresponding Chinese Application No. 2018100858260, 9 pages.
First Chinese Office Action dated Jun. 1, 2020, received or corresponding Chinese Application No. 201810085826.0, 6 pages.
Japanese Office Action dated Nov. 15, 2021, received for corresponding Japanese Application No. 2018167826, pp. 6.

* cited by examiner

VOICE RECOGNITION METHOD, DEVICE AND SERVER

CROSS-REFERENCE TO RELATED APPLICATION

The present application claims the benefit of priority to Chinese Patent Application No. 201810085826.0, filed before the State Intellectual Property Office on Jan. 29, 2018, and entitled "Voice Recognition Method, Device, and Server," which is incorporated in the present application by reference in its entirety.

TECHNICAL FIELD

The present disclosure relates to the field of voice recognition technology, and in particular, to a voice recognition method, device, and a server.

BACKGROUND

With the continuous development of electronic devices, a control system of an electronic device such as a voice control system, which is an important component of the electronic device, is also constantly developed. As voice recognition technology grows rapidly and becomes mature, various voice recognition software has appeared, rendering the communication between people and electronic devices simple and funny. In order to avoid operation error when a person controls the electronic device by voice, a wake-up word may be determined. Only when the electronic device receives the wake-up word for it, will the voice control information from outside be received, and a corresponding operation will be performed according to the voice control information.

Each time the user performs a voice interaction with the electronic device, the electronic device receives the user voice, and transmits the user voice to a server, which performs voice recognition to obtain an instruction included in the user voice. Then, an operation will be performed according to the instruction. However, since much information is included in the user's voice, when the server recognizes the user voice, it is required to recognize the entire user voice, and then filter the user voice to obtain useful information related to the instruction, after which the instruction is executed. This means data to be processed during voice recognition is large, which reduces the efficiency of voice recognition.

SUMMARY

A voice recognition method, device, and a server are provided by embodiments of the present disclosure to solve or alleviate one or more above technical problems, and to at least provide a beneficial choice.

In a first aspect, an embodiment of the present disclosure provides a voice recognition method, including:
receiving a user voice;
determining a wake-up voice of a wake-up word in the user voice, according to an acoustic feature of the user voice; and
labeling the wake-up voice with a silence identifier; and ignoring the wake-up voice based on the silence identifier during voice recognition.

In combination with the first aspect, in a first embodiment of the first aspect of the present disclosure, the determining a wake-up voice of a wake-up word in the user voice, according to an acoustic feature of the user voice includes:
analyzing the user voice, to determine a part of the user voice matched with a voice of a pre-stored wake-up word to be the wake-up voice.

In combination with the first aspect, in a second embodiment of the first aspect of the present disclosure, the ignoring the wake-up voice based on the silence identifier during voice recognition includes:
recognizing the user voice by a decoding algorithm, and ignoring the wake-up voice based on the silence identifier during voice recognition.

In combination with the first aspect, in a third embodiment of the first aspect of the present disclosure, the method further includes:
recognizing other parts of the user voice except the wake-up voice by the decoding algorithm.

In a second aspect, an embodiment of the present disclosure provides a voice recognition device, including:
a receiving module, configured for receiving a user voice;
a determining module, configured for determining a wake-up voice of a wake-up word in the user voice, according to an acoustic feature of the user voice; and
a first recognizing module, configured for labeling the wake-up voice with a silence identifier; and ignoring the wake-up voice based on the silence identifier during voice recognition.

In combination with the second aspect, in a first embodiment of the second aspect of the present disclosure, the determining module includes:
an analyzing sub-module, configured for analyzing the user voice, to determine a part of the user voice matched with a voice of a pre-stored wake-up word to be the wake-up voice.

In combination with the second aspect, in a second embodiment of the second aspect of the present disclosure, the first recognizing module includes:
a recognizing sub-module, configured for recognizing the user voice by a decoding algorithm, and ignoring the wake-up voice based on the silence identifier during voice recognition.

In combination with the second aspect, in a third embodiment of the second aspect of the present disclosure, the device further includes:
a second recognizing module configured for recognizing other parts of the user voice except the wake-up voice by the decoding algorithm.

In a third aspect, the server includes:
one or more processors; and
a storage device, configured to store one or more programs;
when the one or more programs are executed by the one or more processors, the one or more processors implements the voice recognition method in the above first aspect.

In a fourth aspect, an embodiment of the present disclosure provides a computer readable storage medium for storing a computer software instruction used by a voice recognition device and including a program designed for the voice recognition device and for implementing the voice recognition method in the above first aspect.

One or more of the above technical solutions has the following advantages or advantageous effects: in a technical solution according to embodiments of the present disclosure, the wake-up voice in the user voice is labeled with a silence identifier, so that the wake-up voice is ignored during voice recognition. As such, when a complex decoding algorithm is used to recognize the user voice, recognition of a wake-up word that is irrelevant to the an instruction of the user is omitted, thus reducing the data amount to be processed by the decoding algorithm and improving the efficiency of voice recognition.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION

Figure 1:
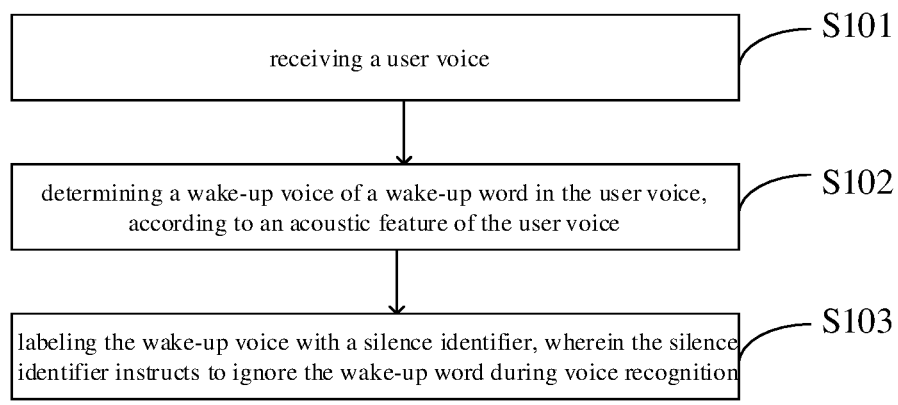
FIG. 1 is a flowchart of a voice recognition method according to a first embodiment of the present disclosure.

Hereinafter, only some exemplary embodiments are simply described. As can be recognized by those skilled in the art, the described embodiments may be modified in various different ways without departing from the spirit or scope of the present disclosure. Accordingly, the drawings and the description should be considered as illustrative in nature instead of being restrictive.

One-shot is one of the currently popular voice interaction technologies. In this technology, a "wake-up word +voice and semantic recognition" method is used to realize zero-interval, zero-delay, seamless connection between the wake-up word and voice control, and the traditional question-and-answer form is abandoned, thereby greatly reducing the number of steps of performing voice control by a user. Moreover, feedback information may be obtained, and operations are simplified. One of the major characteristics of one-shot is to the integration of wake-up word recognition and semantic understanding, which ensures the unity and consistency of voice interaction for the voice control. As a simple example, in the past, a question-and-answer mode is used in the intelligent voice interaction, in which the user issues an instruction comprising a wake-up word, and feedback information of a standby state is required to be sent by the device before the interaction is started. An example is described below.

User: Hi xiaodu! (the user sends a wake-up word to wake up an electronic device)

Device: What can I do for you? (the electronic device responds to the wake-up word, which indicate that it is in an information receiving state)

User: I am going to the airport.

Device: Navigation to the airport starts.

One-shot technology may perform the interactions all at once by the integration of "wake-up word+voice and semantic recognition", for example, to perform such an interaction.

User: Hi xiaodu I am going to the airport.

Device: Navigation to the airport starts.

This process seems to be more efficient than the traditional voice interaction technology.

Wake-up voice instructions and commonly used voice recognition instructions are stored locally, and a client (or an electronic device) receives user voice and responds to the user voice accurately and timely. At the same time, the user voice is sent to a cloud server, which performs voice recognition and semantic understanding. The processing by the client in combination with the cloud server not only ensures the response speed but also ensures the accuracy of the interaction. However, in the conventional technology, the client sends the user voice to the server, the server is required to recognize the entire user voice in which some information that is not irrelevant to the instruction of the user may be included. To this end, a voice recognition method is provided by the embodiment of the present disclosure, in which when the cloud server performs voice recognition, a wake-up word that is irrelevant to the instruction of the user is ignored, to improve the efficiency of voice recognition by the cloud server.

Embodiment 1

A voice recognition method is provided by an embodiment of the present disclosure. FIG. 1 is a flowchart of a voice recognition method according to the embodiment of the present disclosure. The voice recognition method according to the embodiment of the present disclosure includes the following steps:

S101: receiving a user voice.

As described above, the subject for implementing the method according to an embodiment of the present disclosure is a cloud server.

The client may include an electronic device with a voice interaction function, such as a loudspeaker box, a robot with a voice interaction function, an on-vehicle voice interaction system, a search application with a voice interaction function and a map application with a voice interaction function.

When the client detects the user voice, it may determine that there is a wake-up word in the user voice according to the wake-up voice instructions and the commonly used voice recognition instructions stored locally in the client, and is waken up. The client then sends the user voice to the cloud server.

S102: determining a wake-up voice of a wake-up word in the user voice, according to an acoustic feature of the user voice.

The extraction and selection of the acoustic feature is an important part of voice recognition. The extraction of acoustic feature is not only a process of substantial compression of information, but also a process of signal deconvolution. For example, the acoustic feature can be extracted using pitch detection and linear predictive analysis.

S103: labeling the wake-up voice with a silence identifier, wherein the silence identifier instructs to ignore the wake-up word during voice recognition.

In an embodiment, in a voice interaction, the silence identifier is represented by the symbol <s>, which means keeping silence. If this identifier is detected during the recognition process, no recognition result will be generated, or a result of empty will be generated.

For example, with the addition <s> in front of the wake-up voice "xiaoduxiaodu", the recognition process for the wake-up voice will be as follows:

<s> (01) D$[wb] x_T0 iao_T3 d_T0 u_T4 x_T0 iao_T3 d_T0 u_T4[wb]

The recognition process for real silence is as follows:

<s> (02) D$[wb]

The outputs of these two are equivalent, that is, both are silence.

In the technical solution of the embodiment of the present disclosure, the wake-up voice in the user voice is labelled with a silence identifier, so that the wake-up voice is ignored during voice recognition. As such, when a complex decoding algorithm is used to recognize the user voice, recognition of the wake-up word that is irrelevant to the instruction of the user is omitted, thus reducing the data amount to be processed by the decoding algorithm and improving the efficiency of voice recognition.

Embodiment 2

Figure 2:
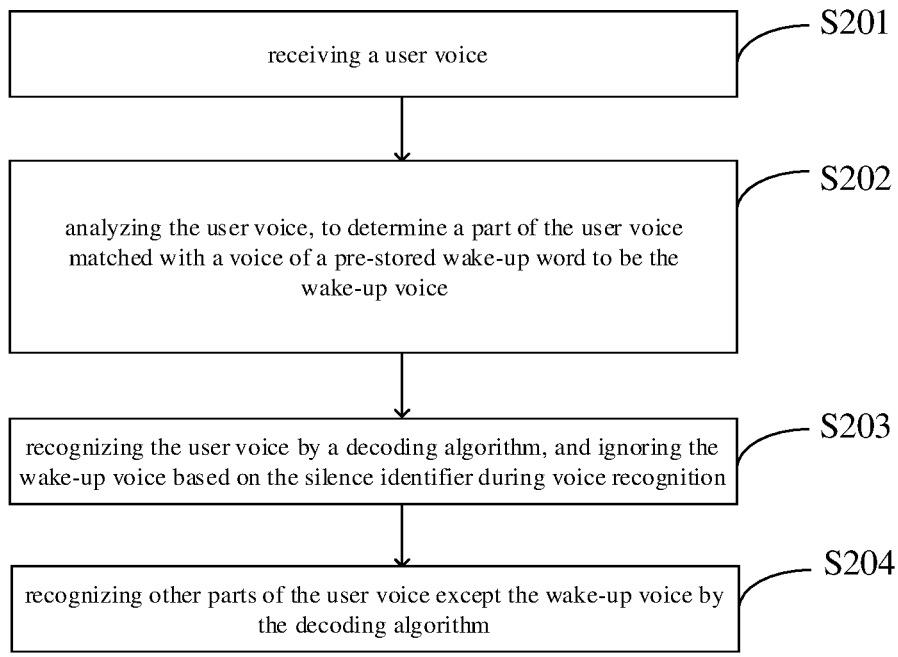
FIG. 2 is a flowchart of a voice recognition method according to a second embodiment of the present disclosure.

Based on the Embodiment 1, a voice recognition method is provided by an embodiment of the present disclosure. FIG. 2 is a flowchart of a voice recognition method of the embodiment of the present disclosure. The voice recognition method of the embodiment of the present disclosure includes the following steps:

S201: receiving a user voice.

S202: analyzing the user voice, to determine a part of the user voice matched with a voice of a pre-stored wake-up word to be the wake-up voice.

Specifically, a voice of the wake-up word may be pre-stored in a cloud server. Then, based on the rule of voice recognition, the received user voice is analyzed based on the voice of the pre-stored wake-up word. If a part of the user voice is matched with the voice the per-stored wake-up word, a silence identifier <s> can be added in front of the wake-up voice of the user voice. The meaning of this identifier <s> is keeping silence. Since the wake-up voice generally includes the pronunciation of two characters which substantially differs from each other, and will be repeated once, such a pronunciation rarely appears in a common voice, and usually does not affect the recognition result.

This step corresponds to step S102 in the Embodiment 1.

S203: recognizing the user voice by a decoding algorithm, and ignoring the wake-up voice based on the silence identifier during voice recognition.

The process of voice recognition is the process of determining the most likely word(s) based on a given acoustic feature. For example, an acoustic model may be established in advance according to a machine learning algorithm, the extracted acoustic feature is sent to the acoustic model for processing, and then a string corresponding to the recognized voice will be output by the acoustic model.

This step is performed after step S103 in the Embodiment 1.

S204: recognizing other parts of the user voice except the wake-up voice by the decoding algorithm.

Generally speaking, voice recognition using a decoding algorithm is one of the cores of voice interaction technology. The objective thereof is to determine the word string with the greatest probability of outputting the voice corresponding to the input voice, based on the acoustics, language models and dictionaries.

After ignoring the wake-up word, in the embodiment of the present disclosure, the other part of the user voice may be recognized according to the decoding algorithm. For example, when the user issues the instruction "xiaoduxiaodu, I am going to the airport", then the wake-up voice of the wake-up word "xiaoduxiaodu" is ignored and "I am going to the airport" will be recognized.

Another effect of the embodiment of the present disclosure is that since there are different characters with the same pronunciation in the Chinese language, an error may be caused in operation. For example, the wake-up word "xiaoduxiaodu (小度小度)" may be recognized as "xiaoduxiaodu (小杜小杜)" during exact recognition. In a case of fuzzy recognition, if a few characters are lost during recognition, a forced filtering will also ignore the first few characters of the other part, rendering a failure in filtering. In the embodiment of the present disclosure, the wake-up word is ignored and not recognized so that the above problems can be avoided.

Embodiment 3

Figure 3:
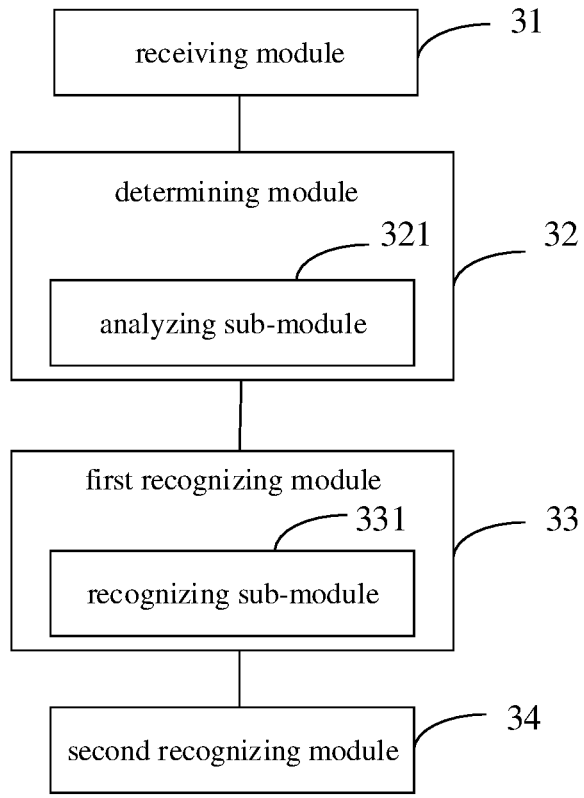
FIG. 3 is a schematic diagram of a voice recognition device according to a third embodiment of the present disclosure.

A voice recognition device is provided according to an embodiment of the present disclosure. FIG. 3 is a schematic diagram of a voice recognition device according to an embodiment of the present disclosure. The voice recognition device according to the embodiment of the present disclosure includes:

the device including:

a receiving module 31, configured for receiving a user voice;

a determining module 32, configured for determining a wake-up voice of a wake-up word in the user voice, according to an acoustic feature of the user voice; and a first recognizing module 33, configured for labeling the wake-up voice with a silence identifier; and ignoring the wake-up voice based on the silence identifier during voice recognition.

Specifically, the determining module 32 includes:

an analyzing sub-module 321, configured for analyzing the user voice, to determine a part of the user voice matched with a voice of a pre-stored wake-up word to be the wake-up voice.

Specifically, the first recognizing module 33 includes:

a recognizing sub-module 331, configured for recognizing the user voice by a decoding algorithm, and ignoring the wake-up voice based on the silence identifier during voice recognition.

Further, the device also includes:

a second recognizing module 34 configured for recognizing other parts of the user voice except the wake-up voice by the decoding algorithm.

In the technical solutions of the present disclosure, recognition of a wake-up word that is irrelevant to the instruction of the user is omitted, thus reducing the data amount to be processed by the decoding algorithm and improving the efficiency of voice recognition. The advantageous effects are identical with those of the first embodiment, and will not be repeatedly discussed herein.

Embodiment 4

Figure 4:
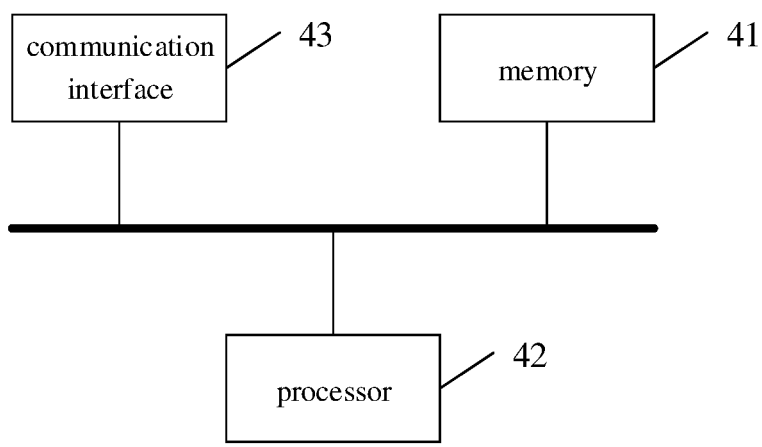
FIG. 4 is a schematic diagram of a server according to a fourth embodiment of the present disclosure.

A server is provided according to an embodiment of the present disclosure. As shown in FIG. 4, the server includes a memory 41 and a processor 42, wherein a computer program that can run on the processor 42 is stored in the memory 41; when the processor 42 executes the computer program, the voice recognition methods in the above embodiments are implemented.; the number the memory 41 and the processor 42 may each be one or more;

the server further includes:

a communication interface 43, configured to enable the memory 41 and the processor 42 to communicate with an external device.

The memory 41 may include a high-speed RAM memory, or may also include a non-volatile memory, such as at least one disk memory.

If the memory 41, the processor 42 and the communication interface 43 are implemented independently, the memory 41, the processor 42 and the communication interface 43 may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 4 to represent the bus, but it does not mean that there is only one bus or only one type of bus.

Optionally, in a specific implementation, if the memory 41, the processor 42 and the communication interface 43 are integrated on one chip, then the memory 41, the processor 42 and the communication interface 43 can complete mutual communication through an internal interface.

Embodiment 5

In an embodiment of the present disclosure, it is provided a computer readable storage medium having a computer program stored thereon that, when executed by a processor, implements the method illustrated in any of the embodiments of FIGS. 1 and 2.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing a particular logical function or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer-readable medium" can be any means that can contain, store, communicate, propagate or transmit programs for use by an instruction execution system, apparatus or device or for use in conjunction with the instruction execution system, apparatus or device.

The computer-readable medium described in the embodiments of the disclosure may a computer-readable signal medium or a computer-readable storage medium or any combination of a computer-readable signal medium and a computer-readable storage medium. More specific examples (non-exhaustive list) of computer-readable storage medium at least include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

In an embodiment of the disclosure, the computer-readable signal medium may include a data signal propagating in a baseband or as a part of a carrier, in which computer-readable program codes are carried. Such propagating data signal can take a variety of forms including, but not limited to, electromagnetic signals, optical signals, or any suitable combination of the electromagnetic signals and optical signals. The computer-readable signal medium may also be any computer-readable medium other than a computer-readable storage medium, and the computer-readable medium can send, propagate or transmit a program for use by an instruction execution system, an input method, or a device or for use in conjunction with an instruction execution system, an input method, or a device. The program codes embodied in the computer-readable medium can be transmitted by any suitable medium, including but not limited to: wireless, wire, optic cable, radio frequency (RF), etc., or any suitable combination of the foregoing.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer-readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. A voice recognition method, comprising:
    receiving, by a cloud server, a user voice sent by an electronic device, wherein the user voice comprises a part of a wake-up voice of a wake-up word and other parts except the wake-up voice;
    determining, by the cloud server, the part of the wake-up voice of the wake-up word in the received user voice, according to an acoustic feature of the received user voice; and
    labeling, by the cloud server, the determined part of the wake-up voice of the wake-up word with a silence identifier; and ignoring, by the cloud server, the part of the wake-up voice based on the silence identifier to omit recognition of the part of the wake-up voice, and recognizing only the other parts except the wake-up voice among the user voice during voice recognition,
    wherein the ignoring, by the cloud server, the part of the wake-up voice based on the silence identifier to omit recognition of the part of the wake-up voice, and recognizing only the other parts except the wake-up voice among the user voice during voice recognition, comprises:
        recognizing, by the cloud server, the received user voice by a decoding algorithm, and ignoring the wake-up voice based on the silence identifier during voice recognition.

2. The voice recognition method of claim 1, wherein determining, by the cloud server, the part of the wake-up voice of the wake-up word in the received user voice, according to an acoustic feature of the received user voice, comprises:
    analyzing, by the cloud server, the received user voice, to determine a part of the received user voice matched with a voice of a pre-stored wake-up word to be the wake-up voice.

3. The voice recognition method of claim 1, wherein, the method further comprises:
    recognizing parts of the received user voice other than the wake-up voice by the decoding algorithm.

4. A server, comprising:
    one or more processors; and
    a storage device, configured to store one or more programs;
    wherein, when the one or more programs are executed by the one or more processors, the one or more processors implements the method of claim 1.

5. A non-transitory computer readable storage medium having a computer program stored thereon that, when executed by a processor, implements the method of claim 1.

6. A voice recognition device, comprising:
    one or more processors; and
    a storage device configured for storing one or more programs, wherein the one or more programs are executed by the one or more processors to enable the one or more processors to:
        receive a user voice sent by an electronic device, wherein the user voice comprises a part of a wake-up voice of a wake-up word and other parts except the wake-up voice;
        determine the part of the wake-up voice of the wake-up word in the received user voice, according to an acoustic feature of the received user voice; and
        label the determined part of the wake-up voice of the wake-up word with a silence identifier; and ignore the part of the wake-up voice based on the silence identifier to omit recognition of the part of the wake-up voice, and recognize only the other parts except the wake-up voice of the wake-up word during voice recognition,
        wherein the one or more programs are executed by the one or more processors to enable the one or more processors to recognize the received user voice by a decoding algorithm and ignore the wake-up voice based on the silence identifier during voice recognition.

7. The voice recognition device of claim 6, wherein the one or more programs are executed by the one or more processors to enable the one or more processors to analyze the received user voice, to determine a part of the received user voice matched with a voice of a pre-stored wake-up word to be the wake-up voice.

8. The voice recognition device of claim 6, wherein the one or more programs are executed by the one or more processors to enable the one or more processors to recognize parts of the received user voice other than the wake-up voice by the decoding algorithm.

* * * * *